J. BUTLER.
Churns.

No. 166,745.  Patented Aug. 17, 1875.

WITNESSES:
S. Thal
J. B. Smith

INVENTOR:
John Butler

UNITED STATES PATENT OFFICE.

JOHN BUTLER, OF BERLIN, WISCONSIN.

IMPROVEMENT IN CHURNS.

Specification forming part of Letters Patent No. 166,745, dated August 17, 1875; application filed July 15, 1875.

*To all whom it may concern:*

Be it known that I, JOHN BUTLER, of Berlin, in the county of Green Lake, in the State of Wisconsin, have invented certain Improvements in Power-Churns, of which the following is a specification:

The object of my invention is to churn milk or cream and produce butter by mechanical power applied by the use of springs, and is arranged with springs applied to wheels, so as to revolve a dasher, with a pendulum to regulate the power, and so arranged that the dasher may be detached from the power and be revolved by hand. The dasher is made double, and arranged so as to be revolved by a reverse motion to gather the butter.

Figure 1:
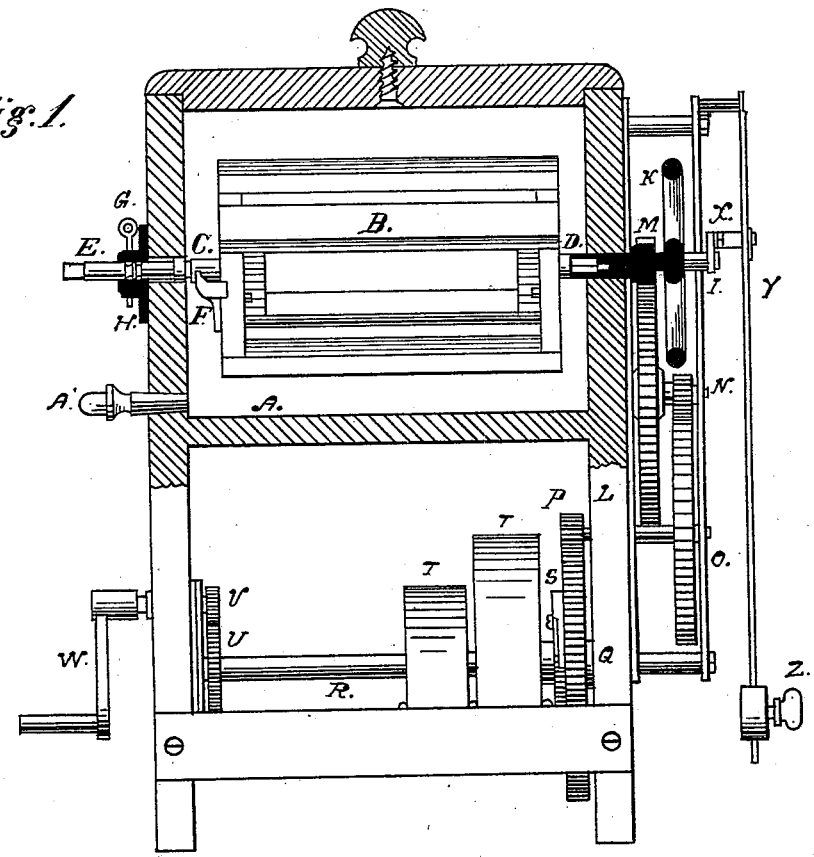
Figure 2:
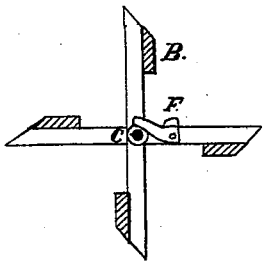

Figure 1 is a sectional view of my invention, and Fig. 2 an end view of dasher.

A is the receptacle for milk or cream to be churned; B, the dasher, which revolves and churns the butter; C, the shaft of the dasher; D, a square end of the dasher, and a round journal, outside of it, fitting into shaft I; E, a center shaft, the end of it passing into the shaft C, and a groove turned into it; F, a catch, which is attached to the end of dasher B, and projects in through shaft C, and into the groove round center shaft E; G, a pin, which passes through a projecting box, H, on the outside of the churn, and into the groove in center shaft E, to hold it from coming out. There is another groove turned in center shaft E, nearer the churn, which, when the dasher B is to be disconnected from the power-works, the pin G is taken out and the center shaft E pulled out far enough for the pin G to pass into the inner groove, which will pull the dasher along far enough to pull the square end of the shaft D out of the square socket in shaft I, and allow the round journal to turn in the shaft I; K, a balance-wheel on shaft I; L, cog-wheel meshing into pinion M on shaft I; N, pinion on the shaft on which is cog-wheel L, meshing into cog-wheel O; P, pinion on the shaft on which cog-wheel O runs, meshing into cog-wheel Q; R, shaft on which cog-wheel Q runs; S, cog-wheel or ratchet-wheel on shaft R, with a pawl on cog-wheel Q meshing into ratchet-wheel S, to hold it when being wound up; T T, springs attached to the frame and shaft R, which, when wound up, propel the churn; U, cog-wheel on the end of shaft R, meshing into pinion V; W, crank with which the churn is wound up; X, a crank on the end of shaft I, and connected to pendulum Y to regulate the motion of the churn; Z, a ball on pendulum-rod Y, which, by being raised or lowered, will regulate the motion faster or slower, as it is raised up or lowered down.

The operation of my invention is as follows: Put the cream into the receptacle A, and with crank W wind up the machine, and it will start and propel dasher B and churn the butter. When it is churned, take out pin G and pull out center shaft E till the inside groove in same will come right for pin G, and then put in pin G. This will detach the dasher from the power. Then put crank W on center shaft E and turn the dasher backward, and that will gather the butter. The dasher B is made in two parts, the inside part turning so as, when the motion is reversed, it makes but one dasher, the rounding side of the dasher working against the butter and gathering same, and if the churn is wanted to be worked by hand it is then in order to do so.

I claim as my invention—

Dasher B and shaft C, journal I, center shaft E, catch F, and pin G, all in combination, substantially as described.

JOHN BUTLER.

Witnesses:
    J. B. SMITH,
    S. THALC.